US006256629B1

(12) United States Patent
Sproat et al.

(10) Patent No.: US 6,256,629 B1
(45) Date of Patent: Jul. 3, 2001

(54) METHOD AND APPARATUS FOR MEASURING THE DEGREE OF POLYSEMY IN POLYSEMOUS WORDS

(75) Inventors: Richard William Sproat, Berkeley Heights, NJ (US); Jan Pieter VanSanten, Brooklyn, NY (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/199,670

(22) Filed: Nov. 25, 1998

(51) Int. Cl.$^7$ .................................................... G06F 17/30
(52) U.S. Cl. ........................................ 707/6; 707/4; 704/2
(58) Field of Search .................................... 707/1, 2, 3, 4, 707/6, 7; 704/1, 2, 3, 4, 7, 9, 10, 200, 216, 217, 218, 219, 220, 222, 237, 238, 239, 240, 243, 245

(56) References Cited

U.S. PATENT DOCUMENTS

| | | | |
|---|---|---|---|
| 4,839,853 | * | 6/1989 | Deerwester et al. ................. 364/900 |
| 5,301,109 | * | 4/1994 | Landauer et al. ................ 364/419.19 |
| 5,541,836 | * | 7/1996 | Church et al. ................... 364/419.07 |
| 5,659,766 | * | 8/1997 | Saund et al. ........................... 395/759 |
| 5,778,362 | * | 7/1998 | Deerwester ............................... 707/5 |
| 5,828,999 | * | 10/1998 | Bellegarda et al. .................. 704/240 |
| 5,950,189 | * | 9/1999 | Cohen et al. ............................. 707/3 |
| 5,987,446 | * | 11/1999 | Corey et al. ............................. 707/3 |
| 6,070,134 | * | 5/2000 | Richardson et al. ...................... 704/9 |
| 6,078,878 | * | 6/2000 | Dolan ....................................... 704/9 |
| 6,098,033 | * | 8/2000 | Richardson et al. ...................... 704/1 |

OTHER PUBLICATIONS

Bellegarda et al., A Novel World Clustering Algorithm Based on Latent Semantic Anlysis; Acoustics, Speech, and Signal Processing, 1996. ICASSP–96. Conference Proceedings 1996 IEEE International Conference on, vol. 1, 1996 pp. 172–175 vol. 1.*

La Cascia et al., Combining Textual and Visual Cues for Content–based Image Retrieval on the World Wide Web; Content–Based Access of Image and Video Libraries, 1998. Proceedings. IEEE on, 1998. pp. 24–28.*

Maletic et al., Automatic Software Clustering via Latent Semantic Analysis; Automated Software Engineering, 1999. 14th IEEE International Conference pp. 251–254.*

Kurimo, Fast Latent Semantic Indexing of Spoken Documents by Using Self–organizing Maps; Acoustics, Speech, and Signal Process, 2000. ICASSP '00. Proceedings. 2000 International Conference on, Vol.: 6, 2000 pp. 2425–2428.*

Hinrich Schütze, Dimensions of Meaning, Proc. of Super-computing '92 (1992).

Hinrich Schütze, Automatic Word Sense Discrimination, Computational Linguistics, vol. 24 No. 1, 97–123 (1998).

* cited by examiner

*Primary Examiner*—Thomas Black
*Assistant Examiner*—Mary Wang
(74) *Attorney, Agent, or Firm*—Ryan, Mason & Lewis, LLP (57) ABSTRACT

A system and apparatus are disclosed for identifying polysemous terms and for measuring their degree of polysemy. A polysemy index provides a quantitative measure of how polysemous a word is. A list of words can be ranked by their polysemy indices, with the most polysemous words appearing at the top of the list. A polysemy evaluation process collects a set of terms near a target term. Inter-term distances of the set of terms occurring near the target term are computed and the multi-dimensional distance space is reduced to two dimensions. The two dimensional representation is converted into radial coordinates. Isotonic/antitonic regression techniques are used to compute the degree to which the distribution deviates from unimodality. The amount of deviation is the polysemy index. A corpus can be preprocessed using the polysemy indices to identify words having clearly separated senses, allowing an information retrieval system to return a separate list of documents for each sense of a word. Self-organizing sense disambiguation techniques can use the polysemy indixces to select canonical contexts for the various senses identified for a given word. Contexts are selected containing terms falling in radial bins near each peak. Such contexts can then be used for subsequent training of a classifier.

33 Claims, 6 Drawing Sheets

METHOD AND APPARATUS FOR MEASURING THE DEGREE OF POLYSEMY IN POLYSEMOUS WORDS

FIELD OF THE INVENTION

The present invention relates generally to word sense disambiguation techniques, and more particularly, to a method and apparatus for identifying ambiguous words and for measuring their degree of ambiguity.

BACKGROUND OF THE INVENTION

Many words have multiple senses. Such words are often referred to as "polysemous words." For example, the word "bass" has two main senses, namely, a type of fish and a musical range. Word sense disambiguation techniques assign sense labels to each instance of an ambiguous word. Information retrieval systems, for example, are plagued by the ambiguity of language. Searches on the word "crane" will retrieve documents about birds, as well as documents about construction equipment. The user, however, is typically interested in only one sense of the word. Generally, the user must review the various documents returned by the information retrieval system to determine which returned documents are likely to be of interest. Of course, the user could narrow the search using boolean expressions of fuller phrases, such as a search in the form: "crane NEAR (whooping OR bird OR lakes . . . )." The user, however, risks missing some examples that do not happen to match the required elements in the boolean expression.

Word sense disambiguation is important in other applications as well, such as in a text-to-speech converter where a different sense may involve a pronunciation difference. Generally, word sense disambiguation techniques presume that a set of polysemous terms is known beforehand. Of course, published lists of polysemous terms invariably provide only partial coverage. For example, the English word "tan" has several obvious senses. A published list of polysemous terms, however, may not include the abbreviation for "tangent." One such published list of polysemous terms is WordNet, an on-line lexical reference system developed by the Cognitive Science Laboratory at Princeton University in Princeton, N.J. See, for example, http://www.cogsci.princeton.edu/~wn/.

Hinrich Schütze has proposed a word sense disambiguation technique that identifies multiple senses of a target word by computing similarities among words that cooccur in a given corpus with a target word. Generally, the Schütze word sense disambiguation technique uses a corpus to compute vectors of word counts for each extant sense of a known ambiguous word. The result is a set of vectors, one for each sense, that can be used to classify a new instance. For a more detailed discussion of the Schütze word sense disambiguation technique, see H. Schütze, "Automatic Word Sense Discrimination," Computational Linguistics, V. 24, No. 1, 97–123 (1998).

While the Schütze technique provides an effective tool for identifying ambiguous words, the Schütze technique does not quantify how ambiguous a given word is in a given corpus. The utility of such word sense disambiguation technique could be further extended if they could rank words by their degree of ambiguity. Thus, a need exists for a word ambiguity detection tool that identifies ambiguous words and quantifies their degree of ambiguity.

SUMMARY OF THE INVENTION

Generally, a method and apparatus are disclosed for identifying polysemous terms and for measuring their degree of polysemy, given an unlabeled corpus. A polysemy index provides a quantitative measure of how polysemous a word is, in a given corpus. Thus, the present invention can rank a list of words by their polysemy indices, with the most polysemous words appearing at the top of the list.

According to one aspect of the invention, a polysemy evaluation process initially collects a set of terms within a certain window of a target term. Thereafter, the inter-term distances of the set of terms occurring near the target term are computed. The multi-dimensional distance space is reduced to two dimensions using well-known dimension reduction techniques. The two dimensional representation is converted into radial coordinates. Isotonic/antitonic regression techniques are used to compute the degree to which the distribution deviates from unimodality. The amount of deviation is the polysemy index.

According to another aspect of the invention, once the ambiguity of a word has been quantitatively measured, a corpus can be preprocessed to identify words having clearly separated senses. Thereafter, if a user of an information retrieval system enters a query on a word having clearly separated senses, the information retrieval system can return a separate list of documents for each sense of the word. The user can then select the desired sense and focus on one of the returned list of documents.

According to yet another aspect of the invention, a self-organizing sense disambiguation technique selects canonical contexts for the various senses identified for a given word. Contexts are selected containing terms falling in radial bins near each peak. Such contexts can then be used for subsequent training of a classifier. Thus, the present invention identifies words associated with the points that fall in bins near each sense-related peak in the distribution. Sentences containing the target word and one or more highly related words are good seed material for the self-organizing method.

A more complete understanding of the present invention, as well as further features and advantages of the present invention, will be obtained by reference to the following detailed description and drawings.

DETAILED DESCRIPTION

Figure 1:
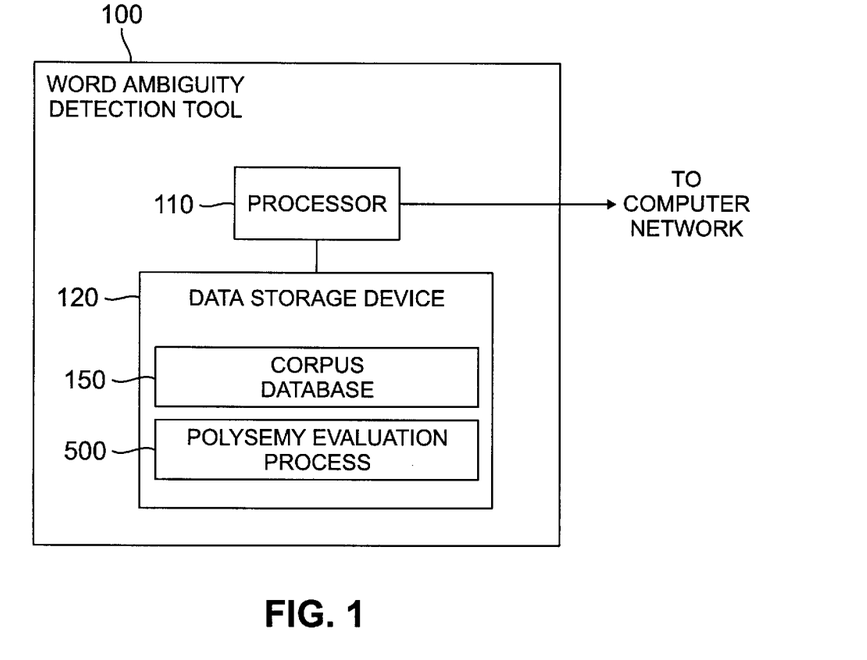
FIG. 1 illustrates a schematic block diagram of a word ambiguity detection tool in accordance with the present invention.

A word ambiguity detection tool 100 according to the present invention is shown in FIG. 1. As discussed further below, the word ambiguity detection tool 100 identifies polysemous words and measures their degree of polysemy, given an unlabeled corpus 150. According to one feature of the present invention, a polysemy index quantitatively measures the degree of polysemy for a word in a given corpus. A list of words can be ranked according to their corresponding polysemy indices, generally with the most polysemous words appearing at the top of the list.

Figure 2:
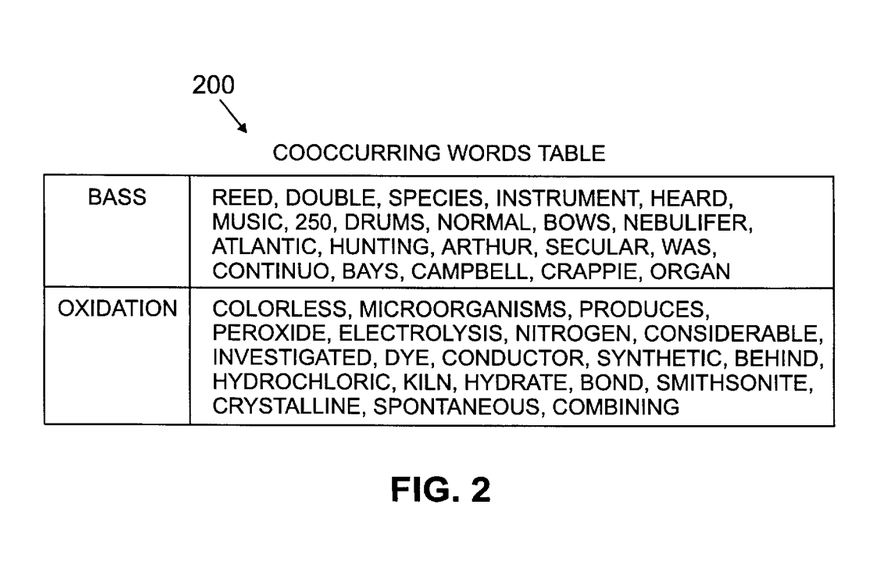
FIG. 2 is a table illustrating a set of words that cooccur with the illustrative words "bass" and "oxidation" in the corpus of FIG. 1.

As discussed further below in conjunction with FIG. 5, polysemous words are identified using a matrix of words that cooccur significantly with a given word. For example, FIG. 2 illustrates twenty randomly selected words that cooccur with the illustrative words "bass" and "oxidation" in a corpus 150. Generally, the word "bass" has at least two obvious senses, namely a music sense and a fish sense. For each pair of words cooccuring with "bass" in FIG. 2, a "distance value" entry is created in the matrix that measures their similarity. Generally, the lower the distance value, the more similar are the two cooccuring words, indicating that they correspond to the same sense of the word "bass" being analyzed. Dimension reduction techniques are then performed to represent the words in a two dimensional space, such that distances in the two dimensional representation correlate maximally with distances in the matrix. The first two eigenvectors of the matrix are selected as the two dimensions.

Figure 3A:
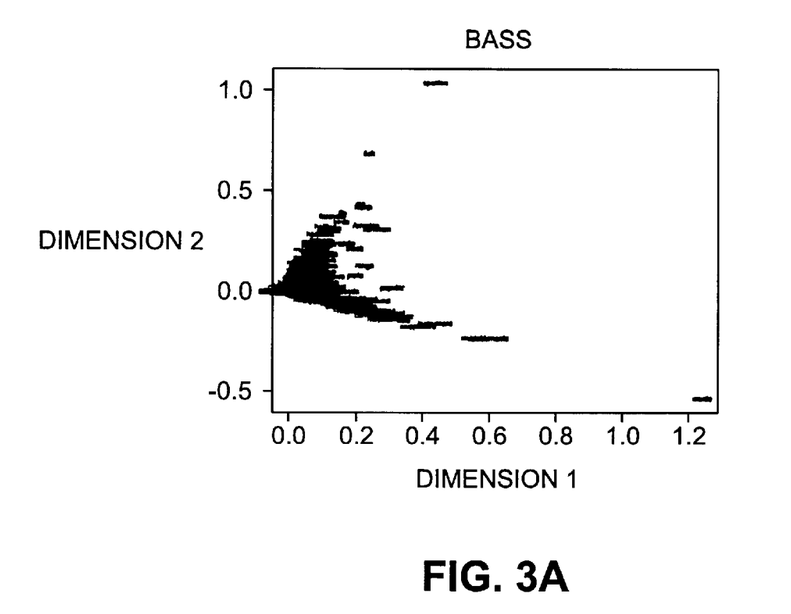
FIGS. 3A and 3B illustrate the first two dimensions for the words "bass" and "oxidation" of FIG. 2.
Figure 3B:
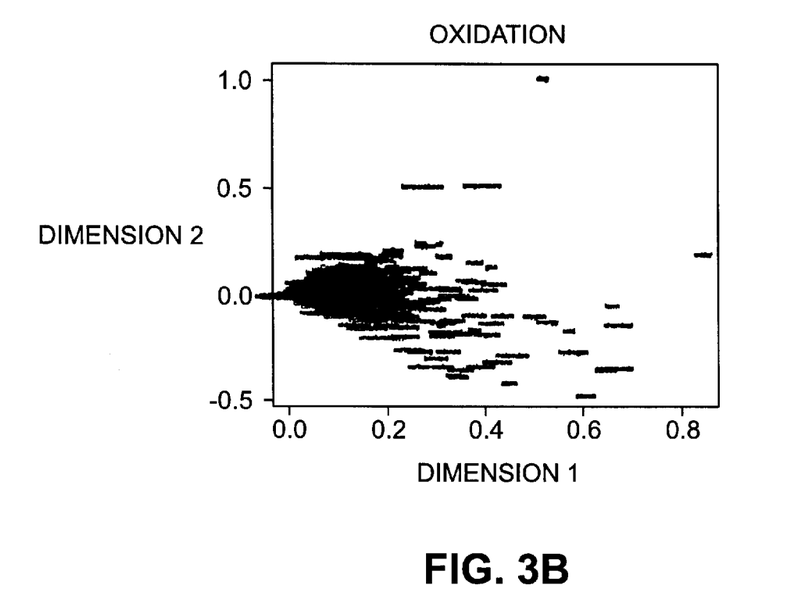

FIGS. 3A and 3B show the first two dimensions for "bass" and "oxidation." For strongly polysemous words, such as "bass" in FIG. 3A, the two dimensional representation typically shows elongated, near-line clusters, with one cluster for each sense, that radiate outwards from a common region. For less polysemous words, such as "oxidation" in FIG. 3B, the radial structure in the two dimensional representation is lacking.

Figure 4A:
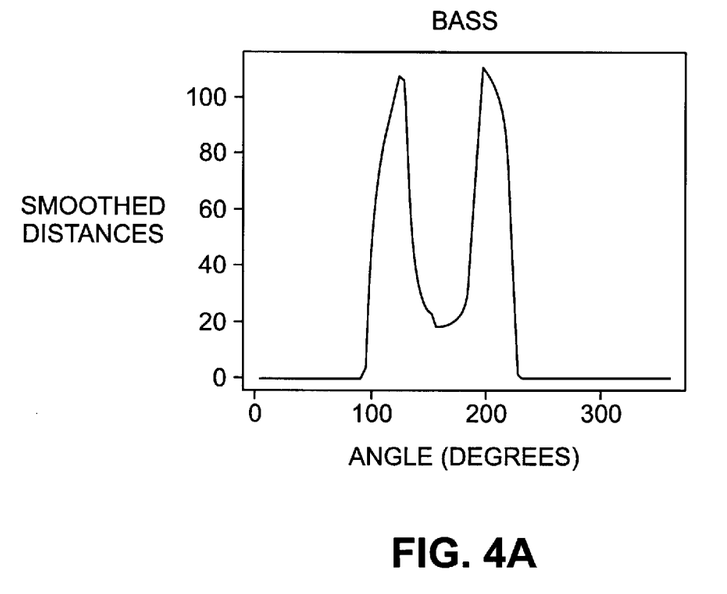
FIGS. 4A and 4B illustrate smoothed distances (abscissa) plotted again radial bins (ordinate) over 360 degrees for the words "bass" and "oxidation" of FIG. 2.
Figure 4B:
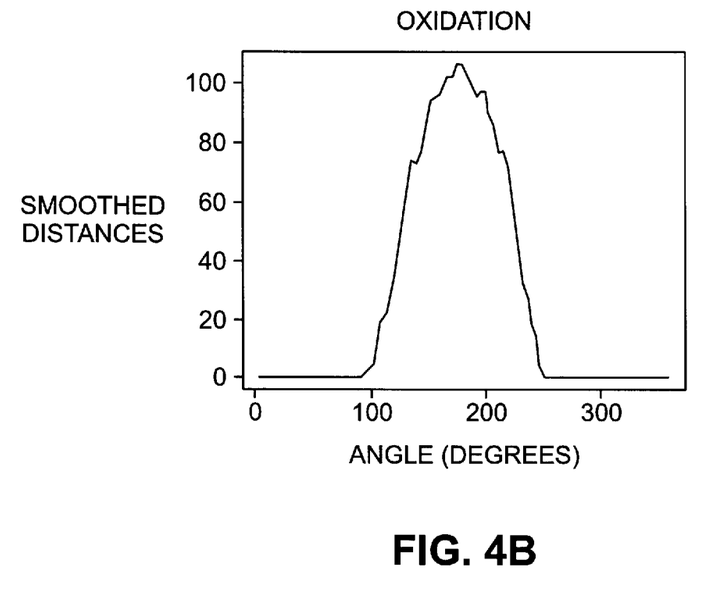

The cartesian points of FIGS. 3A and 3B are converted to radial coordinates and quantized into radial "bins," as shown in FIGS. 4A and 4B. For a highly ambiguous word, the radial representation will have multiple peaks, with one peak for each sense. After smoothing, polysemous words, such as "bass" in FIG. 4A, typically demonstrate multiple, widely separated regions with high entry values, yielding a multi-peaked plot. Non-polysemous words, such as "oxidation" in FIG. 4B, typically demonstrate a single, broad peak.

Thereafter, an isotonic regression algorithm is used to compute the polysemy index, or degree of peakedness of the radial representation.

FIG. 1 is a block diagram showing the architecture of an illustrative word ambiguity detection tool 100 in accordance with the present invention. The word ambiguity detection tool 100 may be embodied as a general purpose computing system, such as the general purpose computing system shown in FIG. 1. As shown in FIG. 1, word ambiguity detection tool 100 preferably includes a processor 110 and related memory, such as a data storage device 120, which may be distributed or local. The processor 110 may be embodied as a single processor, or a number of local or distributed processors operating in parallel. The data storage device 120 and/or a read only memory (ROM) are operable to store one or more instructions, which the processor 110 is operable to retrieve, interpret and execute.

The data storage device 120 preferably includes a corpus database 150 for storing one or more text documents that are used for the polysemy analysis. Generally, the corpus should be a publication covering a wide range of topics, such as an encyclopedia, as opposed to a publication focussed on a limited number of topics, such as sports. In addition, the data storage device 120 preferably includes a polysemy evaluation process 500, discussed further below in conjunction with FIG. 5. Generally, the polysemy evaluation process 500 identifies polysemous words and measures their degree of polysemy, given an unlabeled corpus 150.

POLYSEMY EVALUATION PROCESS

Figure 5:
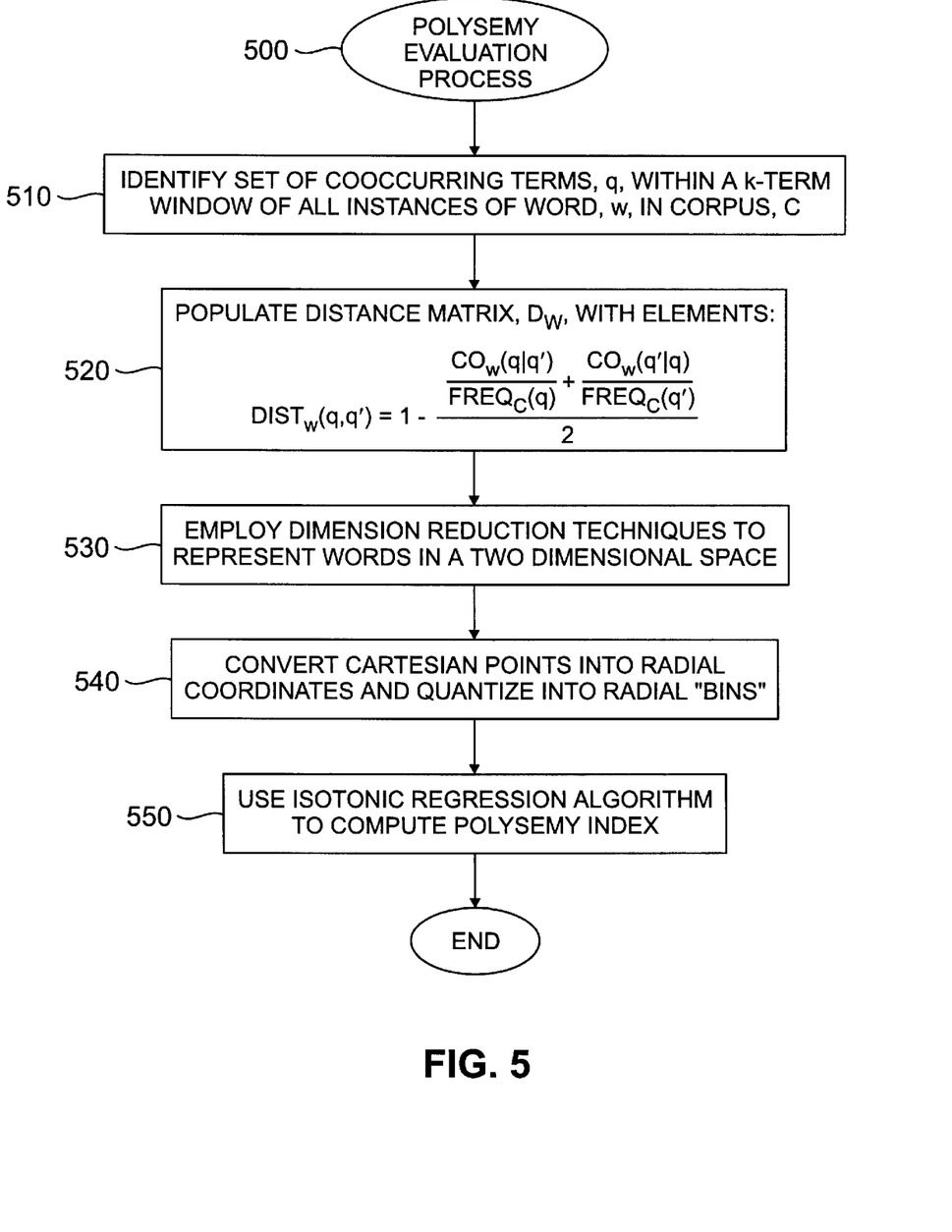
FIG. 5 is a flow chart illustrating the polysemy evaluation process performed by the word ambiguity detection tool of FIG. 1.

As previously indicated, the word ambiguity detection tool 100 uses a polysemy evaluation process 500, shown in FIG. 5, to identify polysemous words and measure their degree of polysemy, given an unlabeled corpus 150. As shown in FIG. 5, the polysemy evaluation process 500 initially identifies a set of cooccurring terms, q, within a k-term window of all instances of a word, w, in the corpus, C, 150 during step 510. In one implementation, the set of cooccurring terms, q, is filtered. $FREQ_w(q)$ is the frequency of q within such k-term window, and $FREQ_c(q)$ is the frequency of q in the corpus, C, 150. $REL_w$ is the set of terms, q, having a size $n_w$, such that:

$FREQ_w(q)/FREQ_c(q)$>a predefined threshold (such as 0.005), and $FREQ_w(q)$>a predefined minimum number (such as 1).

FIG. 2 provides a randomly selected selection of words that cooccur with the words "bass" and "oxidation" in the corpus Grolier's Encyclopedia, with k equal to 30, the predefined threshold for $FREQ_w(q)/FREQ_c(q)$ equal to 0.005, and the predefined minimum number for $FREQ_w(q)$ equal to 1.

For each pair of words, q, q', cooccuring within a k-term window of all instances of the word, w, $CO_w(q'|q)$ indicates the frequency of q' within a W-term window of all instances of q. An $n_w \times n_w$ distance matrix, $D_w$, is populated during step 520 with elements:

$$DIST_w(q, q') = 1 - \frac{\frac{CO_w(q|q')}{FREQ_C(q)} + \frac{CO_w(q'|q)}{FREQ_C(q')}}{2}$$

The distance matrix measures the similarity of each pair of cooccuring words. Generally, the lower the distance value, the more similar are the two cooccuring words, indicating that they correspond to the same sense of the word "bass" being analyzed.

Thereafter, dimensionality reduction techniques are utilized during step 530 to represent the words in a two dimensional space, such that distances in the two dimensional representation correlate maximally with distances in the matrix. The first two eigenvectors of the matrix distribution are selected as the two dimensions. For a more detailed discussion of dimension reduction techniques, see, for example, W. S. Torgerson, Theory and Methods of Scaling, (Wiley, 1958), incorporated by reference herein. FIGS. 3A and 3B show the first two dimensions for "bass" and "oxidation." For strongly polysemous words, such as "bass" in FIG. 3A, the two dimensional representation typically shows elongated, near-line clusters, with one cluster for each sense, that radiate outwards from a common region. For less polysemous words, such as "oxidation" in FIG. 3B, the radial structure in the two dimensional representation is lacking.

The cartesian points of FIGS. 3A and 3B are converted to radial coordinates and quantized into radial "bins" during step 540, as shown in FIGS. 4A and 4B. More specifically, for each, q, compute $distance_w(q)$, from origin in two dimensional representation and $cosine_w(q)$ with respect to the horizontal axis. Given $cosine_w(q)$, select one of 90

4-degree radial bins, for example, and increment the entry for that bin by distance$_w$(q). After smoothing, polysemous words typically demonstrate multiple, widely separated regions with high entry values, yielding a multi-peaked plot, such as the plot for "bass" in FIG. 4A. Non-polysemous words typically demonstrate a single, broad peak, such as the plot for "oxidation" in FIG. 4B.

Thereafter, an isotonic regression algorithm is used during step 550 to compute the polysemy index, or degree of peakedness of the radial representation. More specifically, isotonic/antitonic regression techniques are applied to force a single-peaked fit. The inverse goodness-of-fit metric is used as the polysemy index. Generally, the technique starts with the isotonic regression for a sequence of numbers, $x_1, \ldots, x_n$, which is defined to be a sequence $\hat{x}_1, \ldots, \hat{x}_n$ that minimizes the sum of the squared differences between $\hat{x}_i$ and $x_i$ subject to the constraint that $\hat{x}_1 \leq \hat{x}_2 \leq \ldots \leq \hat{x}_n$. For antitonic regression, we replace "$\leq$" by "$\geq$." In other words, the isotonic (antitonic) regression is the best fitting non-decreasing (non-increasing) curve.

To measure single-peakedness, for each $i=1, \ldots, n$, the isotonic regression is computed for over $1, \ldots, i$, and the anti-tonic regression is computed over $i, \ldots, n$, and add the two sums of squared differences. The peak is then defined to be that value of i for which this combined sum is minimized. The value of this minimum is a measure of the degree to which the points can be fitted with a single-peaked function. It is noted that no assumptions are made about the shape of the single-peaked function. For a more detailed discussion of isotonic regression algorithms, see, for example, R. E. Barlow et al., "Statistical Inference Under Order Restrictions".

For example, the present invention would identify the senses for the word "bass" as music and fish, and assign a polysemy index of 26.61 to the word "bass." For comparison, it is noted that the polysemy index for the relatively non-polysemous word, "oxidation," is 0.23. The corpus 150 used to obtain these experimental results was Grolier's Encyclopedia, with k equal to 30, the predefined threshold for FREQ$_w$(q)/FREQ$_c$(q) equal to 0.005, and the predefined minimum number for FREQ$_w$(q) equal to 1.

PRACTICAL APPLICATIONS

As previously indicated, information retrieval systems are plagued by the ambiguity of language. For example, searches on the word "crane" will retrieve documents about birds, as well as documents about construction equipment. Typically, the user is only interested in one of these senses of the word. The user, however, must review the various documents to determine which identified documents are likely to be of interest. Of course, the user could limit the search by searching on boolean expressions of filler phrases, such as "crane NEAR (whooping OR bird OR lakes . . .)." The user risks missing some examples that do not happen to match the required elements in the expression.

As previously indicated, the present invention allows the potential ambiguity of a word to be quantitatively measured. Thus, a corpus 150 can be preprocessed to identify potentially problematic words. In other words, words having clearly separated senses can be identified. Thereafter, if the user enters a query on a word having clearly separated senses, the information retrieval system could return a separate list of documents for each sense of the word. The user can then select the desired sense and focus on one of the returned list of documents.

Figure 6:
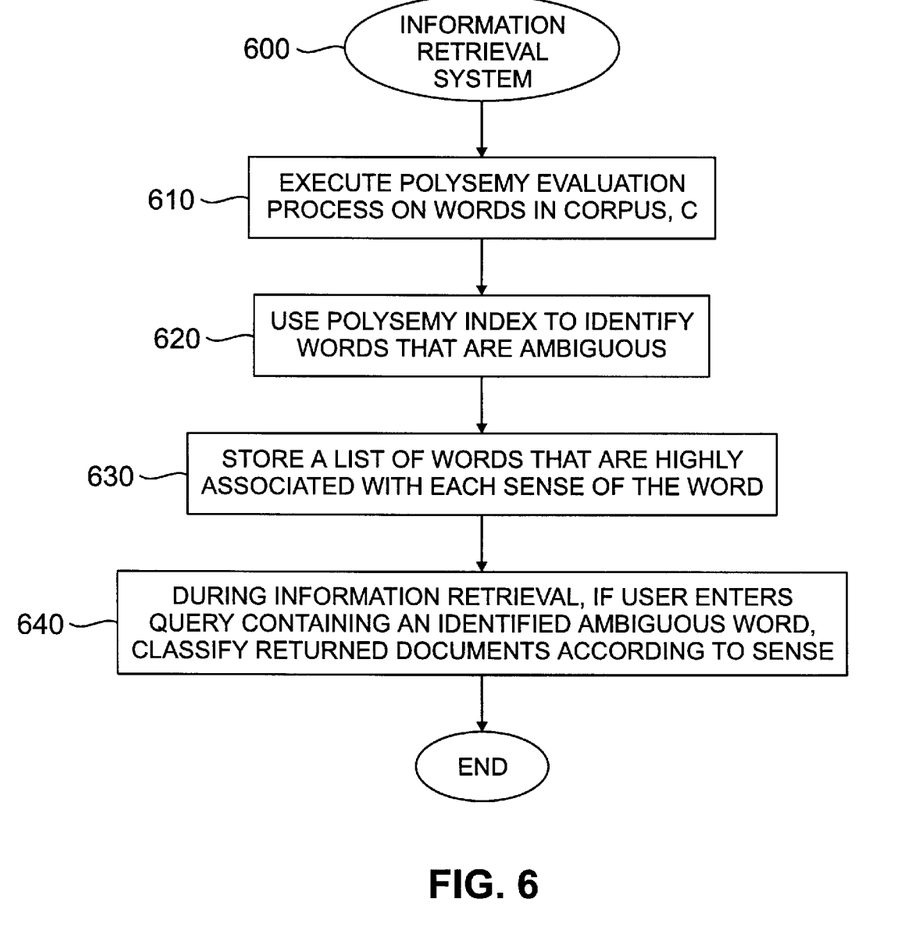
FIG. 6 is a flow chart illustrating an information retrieval process in accordance with the present invention.

FIG. 6 illustrates an implementation of an information retrieval system in accordance with the present invention. As shown in FIG. 6, the polysemy evaluation process 500 is executed on the words in the corpus 150 of interest during step 610. Thereafter, the polysemy index generated by the polysemy evaluation process 500 is used during step 620 to identify words that are ambiguous. A list of words that are highly associated with each sense of the word are stored during step 630.

Finally, during information retrieval, if a user enters a query containing one of the identified ambiguous words, the sense-related collocate words stored during step 630 are used during step 640 to classify the returned documents according to each sense of the ambiguous word.

According to a further feature of the present invention, the polysemy evaluation process 500 can be used to select canonical contexts for the various senses identified for a given word. Contexts are selected containing terms falling in bins near each peak. Such contexts can then be used for subsequent training of a classifier. Self-organizing or minimally supervised methods for sense disambiguation have been proposed, for example, in D. Yarowsky, "Three Machine Learning Algorithms for Lexical Ambiguity Resolution, " Ph.D Thesis, Univ. of Penn. (1996), that assume a set of "seed" examples for each sense. For example, the word "bass" has two main senses, namely, a type of fish and a musical range. Seed instances of each sense would include examples of the use of the word "bass" in sentences having to do with the fish sense versus the musical sense. The present invention provides a measure of the ambiguity of a given word in a particular corpus. In addition, the present invention identifies words that are highly associated with each sense. In other words, the present invention identifies words associated with the points that fall in bins near each sense-related peak in the distribution. Sentences containing the target word and one or more highly related words are good seed material for the self-organizing method.

Figure 7:
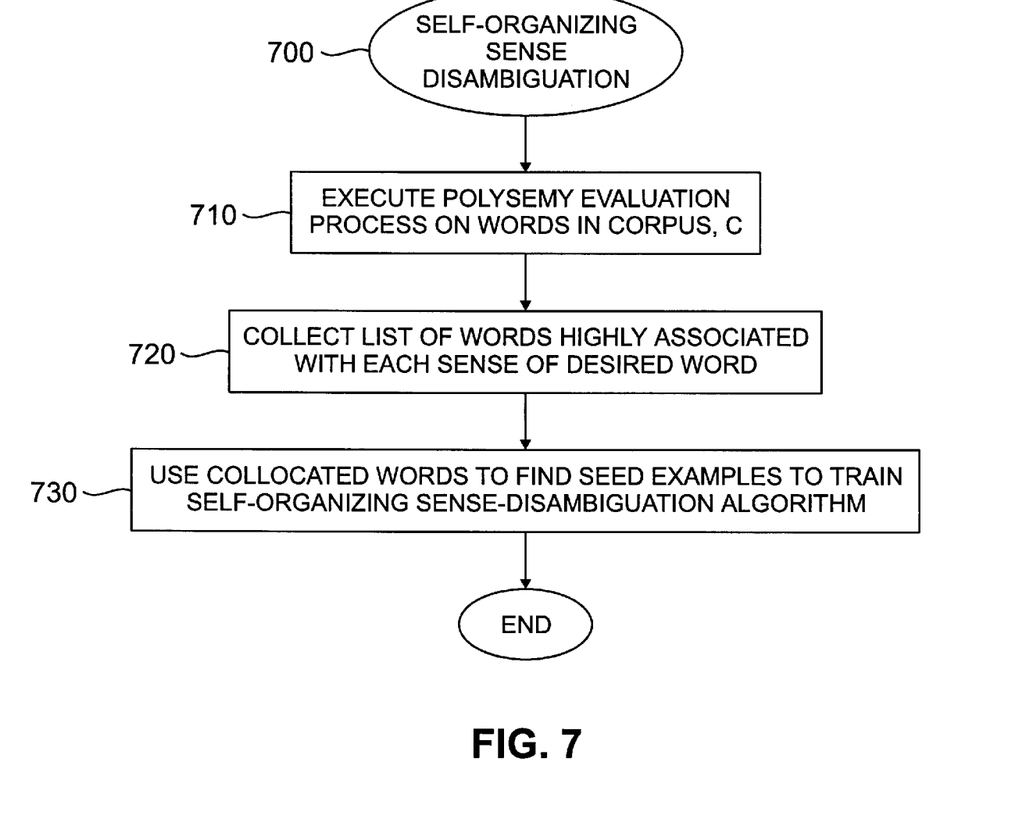
FIG. 7 is a flow chart illustrating a self-organizing sense disambiguation process in accordance with the present invention.

FIG. 7 illustrates an implementation of a self-organizing method for sense disambiguation in accordance with the present invention. As shown in FIG. 7, the polysemy evaluation process 500 is executed on the words in the corpus 150 of interest during step 710. Thereafter, a list of words that are highly associated with each sense of the desired word are collected during step 720. Finally, the collocated words are used during step 730 to find seed examples to train the self-organizing sense-disambiguation algorithm.

It is to be understood that the embodiments and variations shown and described herein are merely illustrative of the principles of this invention and that various modifications may be implemented by those skilled in the art without departing from the scope and spirit of the invention.

We claim:

1. A method for measuring the degree of polysemy of a target term in a corpus, said method comprising the steps of:
    collecting a set of terms from said corpus within a certain window of said target term;
    computing a matrix of inter-term distances of said set of terms;
    reducing the dimension of said matrix of inter-term distances to a two dimensional representation;
    converting said two dimensional representation into radial coordinates; and
    deriving a polysemy index for said target term based on the degree to which the radial distribution deviates from unimodality.

2. The method according to claim 1, wherein isotonic/antitonic regression techniques are used to determine the degree to which the radial distribution deviates from unimodality.

3. The method according to claim 1, wherein an inverse goodness-of-fit metric is used as the polysemy index.

4. The method according to claim 1, further comprising the step of ranking a plurality of words according to their polysemy index.

5. The method according to claim 1, further comprising the step of filtering said set of terms.

6. The method according to claim 5, wherein said filter ensures that the ratio the frequency of each term within said certain window and the frequency of said term in said corpus exceeds a predefined threshold.

7. The method according to claim 5, wherein said filter ensures that the frequency of each term within said certain window exceeds a predefined threshold.

8. The method according to claim 1, wherein said inter-term distances are computed from the equation:

$$DIST_w(q, q') = 1 - \frac{\frac{CO_w(q|q')}{FREQ_C(q)} + \frac{CO_w(q'|q)}{FREQ_C(q')}}{2}$$

where $FREQ_w(q)$ is the frequency of the term within such certain window, and $FREQ_c(q)$ is the frequency of the term in said corpus, and $CO_w(q'|q)$ indicates the frequency of one term, q', within a W-term window of all instances of another term, q.

9. The method according to claim 1, wherein said inter-term distances measure the similarity of each pair of cooccuring words.

10. The method according to claim 1, wherein said dimension reduction step selects the first two eigenvectors of the matrix as the two dimensions.

11. The method according to claim 1, wherein said converting step further comprises the steps of compute a $distance_w(q)$ from an origin in said two dimensional representation and a $cosine_w(q)$ with respect to a horizontal axis and given a $cosine_w(q)$, selecting a radial bin, and incrementing the entry for that bin by $distance_w(q)$.

12. A method for measuring the degree of polysemy of a target term in a corpus, said method comprising the steps of:
collecting a set of terms from said corpus within a certain window of said target term;
generating a radial distribution of inter-term distances for said set of terms; and
deriving a polysemy index for said target term based on the degree to which the radial distribution deviates from unimodality.

13. The method according to claim 12, wherein isotonic/antitonic regression techniques are used to determine the degree to which the radial distribution deviates from unimodality.

14. The method according to claim 12, wherein an inverse goodness-of-fit metric is used as the polysemy index.

15. The method according to claim 12, further comprising the step of ranking a plurality of words according to their polysemy index.

16. The method according to claim 12, wherein said inter-term distances are computed from the equation:

$$DIST_w(q, q') = 1 - \frac{\frac{CO_w(q|q')}{FREQ_C(q)} + \frac{CO_w(q'|q)}{FREQ_C(q')}}{2}$$

where $FREQ_w(q)$ is the frequency of the term within such certain window, and $FREQ_c(q)$ is the frequency of the term in said corpus, and $CO_w(q'|q)$ indicates the frequency of one term, q', within a W-term window of all instances of another term, q.

17. The method according to claim 12, wherein said inter-term distances measure the similarity of each pair of cooccuring words.

18. A system for measuring the degree of polysemy of a target term in a corpus, said system comprising:
a memory for storing computer readable code; and
a processor operatively coupled to said memory, said processor configured to:
collect a set of terms from said corpus within a certain window of said target term;
compute a matrix of inter-term distances of said set of terms;
reduce the dimension of said matrix of inter-term distances to a two dimensional representation;
convert said two dimensional representation into radial coordinates; and
derive a polysemy index for said target term based on the degree to which the radial distribution deviates from unimodality.

19. The system according to claim 18, wherein said processor employs isotonic/antitonic regression techniques to determine the degree to which the radial distribution deviates from unimodality.

20. The system according to claim 18, wherein an inverse goodness-of-fit metric is used as the polysemy index.

21. The system according to claim 18, wherein said processor is further configured to rank a plurality of words according to their polysemy index.

22. The system according to claim 18, wherein said processor is further configured to filter said set of terms.

23. The system according to claim 22, wherein said filter ensures that the ratio the frequency of each term within said certain window and the frequency of said term in said corpus exceeds a predefined threshold.

24. The system according to claim 22, wherein said filter ensures that the frequency of each term within said certain window exceeds a predefined threshold.

25. The system according to claim 18, wherein said inter-term distances are computed from the equation:

$$DIST_w(q, q') = 1 - \frac{\frac{CO_w(q|q')}{FREQ_C(q)} + \frac{CO_w(q'|q)}{FREQ_C(q')}}{2}$$

where $FREQ_w(q)$ is the frequency of the term within such certain window, and $FREQ_c(q)$ is the frequency of the term in said corpus, and $CO_w(q'|q)$ indicates the frequency of one term, q', within a W-term window of all instances of another term, q.

26. The system according to claim 18, wherein said inter-term distances measure the similarity of each pair of cooccuring words.

27. The system according to claim 18, wherein said processor selects the first two eigenvectors of the matrix as the two dimensions during said dimension reduction step.

28. The system according to claim 18, wherein said processor is further configured to compute a $distance_w(q)$ from an origin in said two dimensional representation and a $cosine_w(q)$ with respect to a horizontal axis and given a $cosine_w(q)$, select a radial bin, and increment the entry for that bin by $distance_w(q)$ during said converting step.

29. A method for retrieving information from a corpus, said method comprising the steps of:
deriving a polysemy index for words in said corpus;
identifying words that are ambiguous in said corpus using said polysemy index;

storing a list of words that are associated with each sense of each of said identified ambiguous words; and classifying returned documents according to one of said senses if a query includes one of said identified ambiguous words.

30. The method according to claim 29, wherein said polysemy index is based on the degree to which a radial distribution deviates from a single-peak model.

31. A system for retrieving information from a corpus, said system comprising:

a memory for storing computer readable code; and a processor operatively coupled to said memory, said processor configured to:
- derive a polysemy index for words in said corpus;
- identify words that are ambiguous in said corpus using said polysemy index;
- store a list of words that are associated with each sense of each of said identified ambiguous words; and
- classify returned documents according to one of said senses if a query includes one of said identified ambiguous words.

32. A method for selecting canonical contexts for the plurality of senses of words in a corpus, said method comprising the steps of:

deriving a polysemy index for one or more words in said corpus;

identifying words that are ambiguous in said corpus using said polysemy index;

collecting a list of words that are associated with each sense of said identified ambiguous words; and obtaining seed examples using said collected list of words to train a self-organizing sense-disambiguation algorithm.

33. A system for for selecting canonical contexts for the plurality of senses of words in a corpus, said system comprising:

a memory for storing computer readable code; and a processor operatively coupled to said memory, said processor configured to:
- derive a polysemy index for one or more words in said corpus;
- identify words that are ambiguous in said corpus using said polysemy index;
- collect a list of words that are associated with each sense of said identified ambiguous words; and
- obtain seed examples using said collected list of words to train a self-organizing sense-disambiguation algorithm.

* * * * *